United States Patent
Park et al.

(10) Patent No.: US 11,105,893 B2
(45) Date of Patent: Aug. 31, 2021

(54) RADAR DEVICE

(71) Applicant: ELECTRONICS AND TELECOMMUNICATIONS RESEARCH INSTITUTE, Daejeon (KR)

(72) Inventors: Pil Jae Park, Daejeon (KR); Seongdo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 296 days.

(21) Appl. No.: 16/194,978

(22) Filed: Nov. 19, 2018

(65) Prior Publication Data

US 2019/0178984 A1    Jun. 13, 2019

(30) Foreign Application Priority Data

Dec. 12, 2017  (KR) .......................... 10-2017-0170693

(51) Int. Cl.
  *G01S 7/282*  (2006.01)
  *G01S 7/03*  (2006.01)

(52) U.S. Cl.
  CPC .............. *G01S 7/282* (2013.01); *G01S 7/032* (2013.01)

(58) Field of Classification Search
  CPC ......... G01S 13/526; G01S 7/282; G01S 7/032
  USPC ......................................................... 342/88
  See application file for complete search history.

(56) References Cited

U.S. PATENT DOCUMENTS

| 1,624,537 A | * | 4/1927 | Colpitts | .................. | H03B 5/10 |
| | | | | | 455/121 |
| 6,137,438 A | * | 10/2000 | McEwan | ............... | G01S 7/2922 |
| | | | | | 342/118 |
| 6,700,530 B1 | * | 3/2004 | Nilsson | ..................... | G01S 7/03 |
| | | | | | 342/124 |

(Continued)

FOREIGN PATENT DOCUMENTS

KR    1020170091203 A    8/2017

OTHER PUBLICATIONS

V.V. Ulansky, H.M. Elsherif, "A New Method of Designing UHF FET Colpitts Oscillator", Materials of 2014 IEEE XXXIV International Scientific Conference Electronics and Nanotechnology (ELNANO), p. 388 (Year: 2014).*

(Continued)

*Primary Examiner* — Bernarr E Gregory
*Assistant Examiner* — Alexander L. Syrkin (57) ABSTRACT

Provided is a radar device including a clock generator, a transmitter, and a receiver. The clock generator may output a transmission clock, and output a reception clock after a delay from a time at which the transmission clock is output. The transmitter may include a transmission trigger signal generator to generate a transmission trigger signal based on the transmission clock and an oscillator configured to generate a first signal on the basis of the transmission trigger signal. The first signal and the transmission trigger signal may include a pulse, and a width and a magnitude of the pulse included in the first signal correspond to a width and a magnitude of the pulse included in the transmission trigger signal, respectively. The receiver may be configured to receive an echo signal corresponding to the first signal to generate a second signal based on the reception clock.

20 Claims, 8 Drawing Sheets

(56) References Cited

U.S. PATENT DOCUMENTS

| | | | |
|---|---|---|---|
| 8,618,858 B2 | 12/2013 | Kim et al. | |
| 9,581,688 B2* | 2/2017 | Park | G01S 7/28 |
| 10,444,338 B2* | 10/2019 | Arlelid | G01S 13/103 |
| 2006/0197701 A1* | 9/2006 | Heide | G01S 7/032 |
| | | | 342/118 |
| 2007/0132633 A1* | 6/2007 | Uchino | G01S 13/10 |
| | | | 342/118 |
| 2013/0285728 A1 | 10/2013 | Granhaug et al. | |

OTHER PUBLICATIONS

Vella Kukk, "Large Signal Models for Oscillator Design" in 1998 IEEE International Symposium on Circuits and Systems (ISCAS) (vol. 3, pp. 667-670 vol. 3 (Year: 1998).*

Robert E. Collin "Foundations for Microwave Engineering", Wiley-IEEE Press 2001 (Edition: 2, p. 944), Chapter 12 "Oscillators and Mixers" p. 831-875. (Year: 2001).*

E. Lindberg, K. Murali and A. Tamasevicius, "The Colpitts Oscillator Family" Proceedings NWP-2008, International Symposium: Topical Problems of Nonlinear Wave Physics, Nizhny Novgorod, Jul. 20-26, 2008. NWP-1: Nonlinear Dynamics of Electronic Systems—NDES'2008, pp. 47-48, Presentation slides 1-69 (Year: 2008).*

D. W. Maki, J. M. Schellenberg, H. Yamasaki and L. C. T. Liu, "A 69 GHz Monolithic FET Oscillator," 1984 IEEE MTT-S International Microwave Symposium Digest, San Francisco, CA, USA, 1984, pp. 39-43, doi: 10.1109/MWSYM.1984.1131681. (Year : 1984).*

Y. Chen, K. Mouthaan and F. Lin, "Design of X-Band and Ka-Band Colpitts Oscillators Using a Parasitic Cancellation Technique," in IEEE Transactions on Circuits and Systems I: Regular Papers, vol. 57, No. 8, pp. 1817-1828, Aug. 2010, doi: 10.1109/TCSI.2009.2037399. (Year: 2010).*

\* cited by examiner

RADAR DEVICE

CROSS-REFERENCE TO RELATED APPLICATIONS

This U.S. non-provisional patent application claims priority under 35 U.S.C. § 119 of Korean Patent Application No. 10-2017-0170693, filed on Dec. 12, 2017, the entire contents of which are hereby incorporated by reference.

BACKGROUND

The present disclosure herein relates to an electronic device, and more particularly, to a radar device for acquiring information on a target.

A radar may transmit and receive a radio wave. The radar measures a time from a transmission time of the radio wave to a reception time of a reflected wave. The radar detects the orientation and a location of an object that reflects a transmitted radio wave. The radio wave used for the radar may have a frequency in a band from several MHz to several tens of GHz.

A kind of the radar includes a pulse radar and a continuous wave radar. The pulse radar emits a transmission pulse signal. The pulse radar repeatedly emits the transmission pulse signal and receives an echo signal reflected by a target.

As the magnitude of the transmission signal is larger, the magnitude of the received echo signal may be larger. As the magnitude of the echo signal is larger, the pulse radar may further accurately acquire information on the target. Accordingly, it is necessary to make the magnitude of the transmission signal large in order to improve the performance of the pulse radar.

SUMMARY

The present disclosure provides a radar device configured to emit a transmission signal having the large magnitude.

An embodiment of the inventive concept provides a radar device may include a clock generator, a transmitter, and a receiver. The clock generator may be configured to output a transmission clock, and output a reception clock after a delay from a time at which the transmission clock is output. The transmitter may be configured to include a transmission trigger signal generator configured to generate a transmission trigger signal on the basis of the transmission clock and an oscillator configured to generate a first signal on the basis of the transmission trigger signal. Each of the first signal and the transmission trigger signal may include a pulse, and a width and a magnitude of the pulse included in the first signal correspond to a width and a magnitude of the pulse included in the transmission trigger signal, respectively. The receiver may be configured to receive an echo signal corresponding to the first signal to generate a second signal on the basis of the reception clock.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, an exemplary embodiment of the present disclosure will be described in detail with reference to the accompanying drawings such that a person skilled in the art may easily carry out the embodiments of the present disclosure.

Hereinafter, terms "transmission signal" is used in the present specification. Hereinafter, the transmission signal means a signal emitted from a radar device in order to detect an object or the like. Hereinafter, terms "echo signal" is used in the present specification. Hereinafter, the echo signal may mean a signal having been reflected by the object or the like and received by the radar device.

Figure 1:
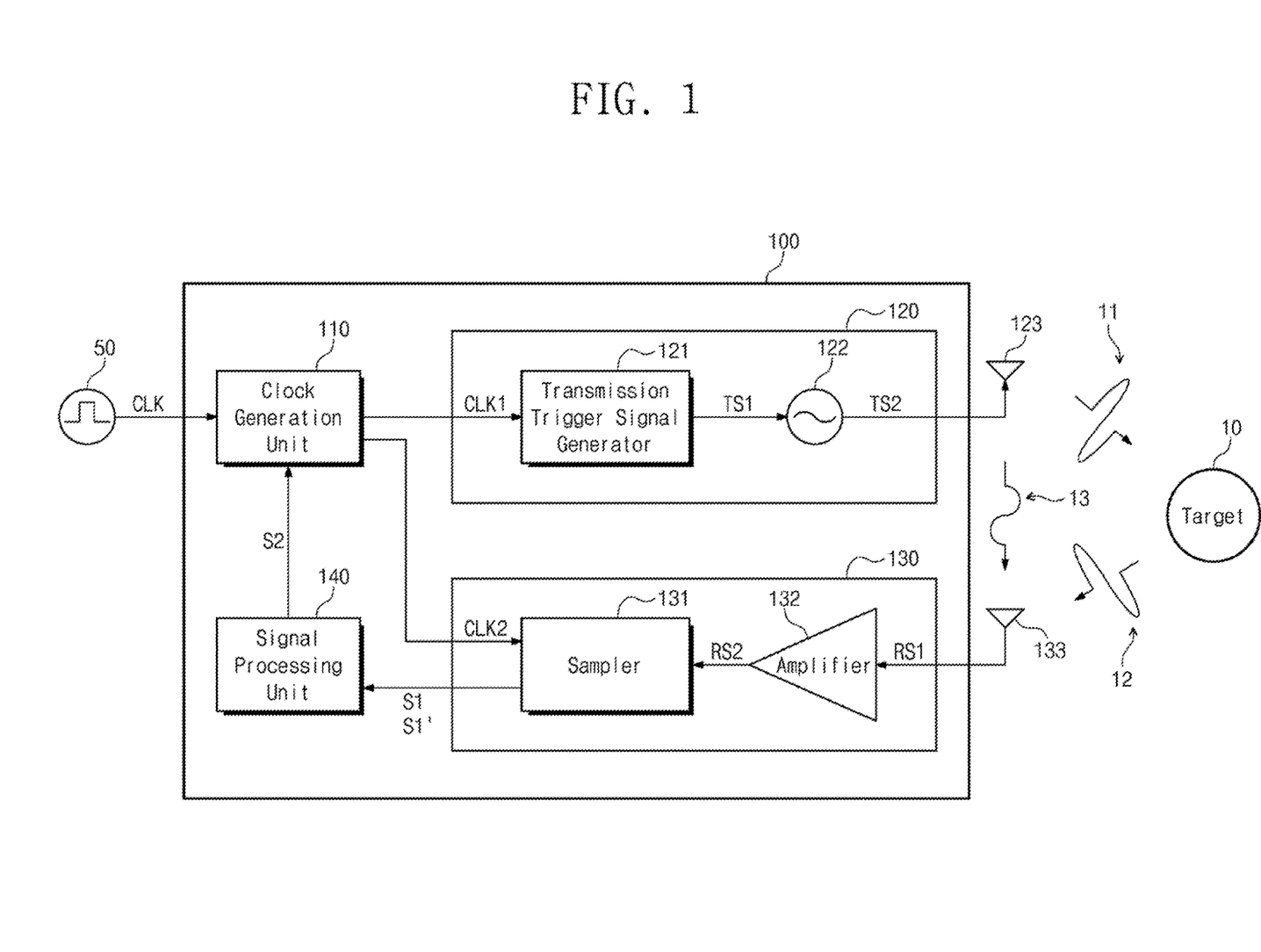
FIG. 1 is a block diagram illustrating a radar device according to an embodiment of the present disclosure.

FIG. 1 is a block diagram illustrating a radar device according to an embodiment of the present disclosure.

Referring to FIG. 1, the radar device 100 may include a clock generation unit 110, a transmission unit 120, a reception unit 130, and a signal processing unit 140. A transmission antenna 123 and a reception antenna 133 are connected to the radar device 100. The transmission unit 120 may include a transmission trigger signal generator 121, and an oscillator 122. The reception unit 130 may include a sampler 131, and an amplifier 132.

The clock generation unit 110 may receive a reference clock CLK from a reference clock generator 50. The clock generation unit 110 may generate a clock (hereinafter, transmission clock, CLK1) used to generate transmission signals 11 and 13 in the transmission unit 120 on the basis of the reference clock CLK. The clock generation unit 110 may generate a clock (hereinafter, reception clock, CLK2) used to process a signal in the reception unit 130 on the basis of the reference clock CLK. The clock generation unit 110 may output the transmission clock CLK1 to the transmission unit 120, and the reception clock CLK2 to the reception unit 130.

Each of the transmission clock CLK1 and the reception clock CLK2 may have a logic low value or a logic high value periodically. The logic high values or the logic low values of the transmission clock CLK1 and the reception clock CLK2 may correspond to the magnitudes of specific voltages, respectively.

The clock generation unit 110 may output the reception clock CLK2 to the reception unit 130, after a delay has passed from a time when the transmission clock CLK1 had been output to the transmission unit 120. The delay may be related to a detection range of the radar device 100. The clock generation unit 110 may adjust the delay to adjust the detection range of the radar device 100. For example, as the delay is longer, the detection range of the radar device 100 may be longer. As the delay is shorter, the detection range of the radar device 100 may be shorter. The delay and the detection range will be described in detail together with the operation of the signal processing unit 140.

The transmission unit 120 may receive the transmission clock CLK1 from the clock generation unit 110. The transmission unit 120 may emit a transmission signal 11 and a transmission signal 13 on the basis of the transmission clock CLK1. The transmission signal 11 and the transmission signal 13 are signals having central frequencies and being oscillated during a time corresponding to a specific width to be periodically generated. Accordingly, each of the transmission signal 11 and the transmission signal 13 may have a period.

The transmission trigger signal generator 121 may receive the transmission clock CLK1 from the clock generation unit 110. The transmission trigger signal generator 121 may generate a transmission trigger signal TS1 on the basis of the transmission clock CLK1. The transmission trigger signal generator 121 may generate the transmission trigger signal TS1 in response to the logic high value of the transmission clock CLK1. For example, the transmission trigger signal generator 121 may generate the transmission trigger signal TS1 in response to a rising edge of a section in which the logic value of the transmission clock CLK1 is changed from the logic low value to the logic high value.

Referring to the FIGS. 4 and 6, a detailed scheme for generating the transmission trigger signal will be described. The transmission trigger signal generator 121 may output the transmission trigger signal TS1 to the oscillator 122.

The oscillator 122 may receive the transmission trigger signal TS1 from the transmission trigger signal generator 121. The oscillator 122 may generate a signal TS2 on the basis of the transmission trigger signal TS1. For example, the oscillator 122 may generate the signal TS2 on the basis of a transmission trigger pulse included in the transmission trigger signal TS1. The signal TS2 may be a signal having a center frequency and be defined by the width and the magnitude. For example, the signal TS2 may include a sinusoidal wave having the center frequency. Hereinafter, the magnitude of the signal TS2 may be ½ of the peak-to-peak voltage of the signal TS2 (refer to FIGS. 4 and 6). In addition, the signal TS2 may have a common mode voltage. A detailed description about the signal TS2 will be provided with reference to FIGS. 5 and 7. The oscillator 122 may output the signal TS2 to the transmission antenna 123.

The transmission antenna 123 receives the signal TS2 from the oscillator 122. The transmission antenna 123 may emit a wireless signal on the basis of the signal TS2. In an example of FIG. 3, the transmission antenna 123 may emit the transmission signal 11 and the transmission signal 13 on the basis of the signal TS2. In FIG. 1, the transmission signal 11 and the transmission signal 13 are separately illustrated, but the transmission signal 11 and the transmission signal 13 are included in one transmission signal. Accordingly, the transmission antenna 123 emits the transmission signal 11 and the transmission signal 13 substantially at the same time. Hereinafter, for convenience of explanation, the transmission signal 11 and the transmission signal 13 will be described as separate signals.

The signal TS2 may be generated on the basis of the transmission trigger signal TS1, and the transmission signal 11 may correspond to the signal TS2. Accordingly, the transmission trigger signal generator 121 may determine characteristics of the transmission signal 11 and the transmission signal 13 through the transmission trigger signal TS1. For example, the period of the transmission signal 11 may be substantially identical to that of the transmission trigger signal TS1. For example, the magnitude of the transmission signal 11 may be determined on the basis of the magnitude of a pulse included in the transmission trigger signal TS1. For example, the width of the transmission signal 11 may be determined on the basis of the width of a pulse included in the transmission trigger signal TS1. A detailed description will be provided about a relationship between transmission signal 11 and the transmission trigger signal TS1 with reference to FIGS. 4 and 6.

The transmission unit 120 may emit the transmission signal 11 to a target 10. The transmission signal 11 may be reflected by the target 10. The echo signal 12 may be generated from the transmission signal 11 reflected by the target 10. Accordingly, the echo signal 12 may represent information related to the target 10. For example, the echo signal 12 may represent information related to a location and a speed of the target 10. The echo signal 12 may be received by the reception unit 130 from the target 10. The echo signal 12 may correspond to the transmission signal 11, and the transmission signal 11 may be generated on the basis of the signal TS2. Accordingly, the echo signal 12 may correspond to the signal TS2.

The reception unit 130 may receive the reception clock CLK2 from the clock generation unit 110. The reception unit 130 may receive a signal from the outside. In an example of FIG. 1, the reception unit 130 may receive, from the target 10, the echo signal 12 corresponding to the transmission signal 11. The echo signal 12 may include pulses having the specific width and magnitude. The width and magnitude of the pulse included in the echo signal 12 may be related to the width and magnitude of the pulse included in the transmission signal 11, respectively, For example, as the magnitude of the pulse included in the transmission signal 11 is larger, the magnitude of the pulse included in the echo signal 12 may be larger.

The reception antenna 133 may receive the echo signal 12 corresponding to the transmission signal 11. In response to the received echo signal 12, the reception antenna 133 may output a signal RS1 generated on the basis of the echo signal 12 to the amplifier 132.

The amplifier 132 may receive the signal RS1 from the reception antenna 133. The amplifier 132 may amplify the received signal RS1. For example, the amplifier 132 may be a low noise amplifier, and may be implemented with one of a parametric amplifier, a Field Effect Transistor amplifier, a tunnel diode amplifier, and a low noise traveling wave tube amplifier, etc. For example, the amplifier 132 may be implemented with a single element. The amplifier 132 may output an amplified signal RS2 to the sampler 131.

As described above, the signal RS1 and the amplified signal RS2 may be amplified on the basis of the echo signal 12 and the signal RS1, respectively. Accordingly, the characteristics of the RS2 may be related to the characteristics of the echo signal 12. Accordingly, the signal RS2 may correspond to the echo signal 12.

The sampler 131 may receive the reception clock CLK2 from the clock generation unit 110. The sampler 131 may sample the amplified signal RS2 received from the amplifier 132 on the basis of the reception clock CLK2. For example, the sampler 131 may sample the amplified signal RS2 in response to a rising edge of a section in which a logic value of the reception clock CLK2 is changed from a logic low value to a logic high value. Accordingly, the sampler 131 may sample the amplified signal RS2 in response to the rising edge of the reception clock CLK2 output after a delay from a time when the transmission clock CLK1 has been output. The sampler 131 may sample the amplified signal RS2 in response to rising edges of the repeatedly output reception clock CLK2 and generate a signal S1.

Since the signal S1 is generated based on the amplified signal RS2, and the signal RS1 is generated based on the echo signal 12, the signal S1 may be related to the echo signal 12. Accordingly, the signal S1 may represent information related to the target 10. The sampler 131 may output the signal S1 to the signal processing unit 140.

The signal processing unit 140 may calculate values related to the target 10 on the basis of the signal S1 received from the reception unit 130. For example, the signal processing unit 140 may calculate the location and the speed of the target 10 on the basis of the signal S1. In addition, the signal processing unit 140 may calculate the delay on the basis of the signal S1. The delay may correspond to a time between a time when the transmission clock CLK1 is output from the clock generation unit 110 and a time when the reception clock CLK2 is output from the clock generation unit 110. Hereinafter, a process in which the delay is calculated will be described in detail.

The reception antenna 133 may directly receive the transmission signal 13 from the transmission antenna 123. The reception unit 130 may generate a signal S1' on the basis of the transmission signal 13 directly received from the transmission antenna 123. The reception unit 130 may generate the signal S1' in a similar scheme to that of the signal S1. The reception unit 130 may output the signal S1' to the signal processing unit 140.

The signal processing unit 140 may receive the signal S1'. The signal processing unit 140 may calculate a time when the signal S1' is received. Thereafter, the signal processing unit 140 may calculate a time when the signal S1 is received. The signal processing unit 140 may calculate a time Δt1 between the reception time of the signal S1' and the reception time of the signal S1.

The signal S1 may correspond to the echo signal 12, and the echo signal 12 may be related to the target 10. Accordingly, the time Δt1 may be related to the target 10. For example, the time Δt1 may be related to the location of the target 10. The range (hereafter, detection range) from the radar device 100 to the location of the target 10 may be proportional to the time Δt1. The signal processing unit 140 may calculate a delay between the transmission clock CLK1 and the reception clock CLK2 on the basis of the time Δt1.

The signal processing unit 140 may output a signal S2 for controlling the delay between the transmission clock CLK1 and the reception clock CLK2 to the clock generation unit 110. The clock generation unit 110 may output the transmission clock CLK1 and the reception clock CLK2 on the basis of the signal S2. For example, the clock generation unit 110 may output the transmission clock CLK1 to the transmission unit 120, and the reception clock CLK2 to the reception unit 130 after the delay.

For example, the clock generation unit 110 may include a delay locked loop (DLL) for outputting the transmission clock CLK1 and the reception clock CLK2 on the basis of the delay. The DLL may include a multi-layered voltage-controlled delay line (VCDL). The multi-layered VCDL may generate clocks having various delays using the reference clock CLK. For example, the multi-layered VCDL may generate clocks delayed as much as times obtained by equally dividing the period of the reference clock CLK. The DLL may generate the transmission clock CLK1 using pulses generated by the multi-layered VCDL. In addition, the DLL may generate the reception clock CLK2 further delayed than the transmission clock CLK1. Accordingly, the clock generation unit 110 may adjust the delay using the clocks generated by the VCDL.

As described above, the transmission signal 11 may be generated on the basis of the transmission trigger signal TS1 and the transmission trigger signal TS1 may be generated based on the transmission clock CLK1. Accordingly, a time when the transmission clock CLK1 is output from the clock generation unit 110 may be related to a time when the transmission signal 11 is emitted from the transmission unit 120.

The signal S1 may be generated by sampling the signal RS2 on the basis of the reception clock CLK2. The RS2 may correspond to the echo signal 12. Accordingly, a time when the transmission clock CLK2 is output from the clock generation unit 110 may be related to a time when the echo signal 12 is received by the reception unit 130.

The delay (a time between an output time of the transmission clock CLK1 and an output time of the reception clock CLK2) may be a value based on the time Δt1 and the time Δt1 may be a value proportional to the detection range. Accordingly, the signal processing unit 140 may adjust the delay to adjust the detection range.

Figure 2:
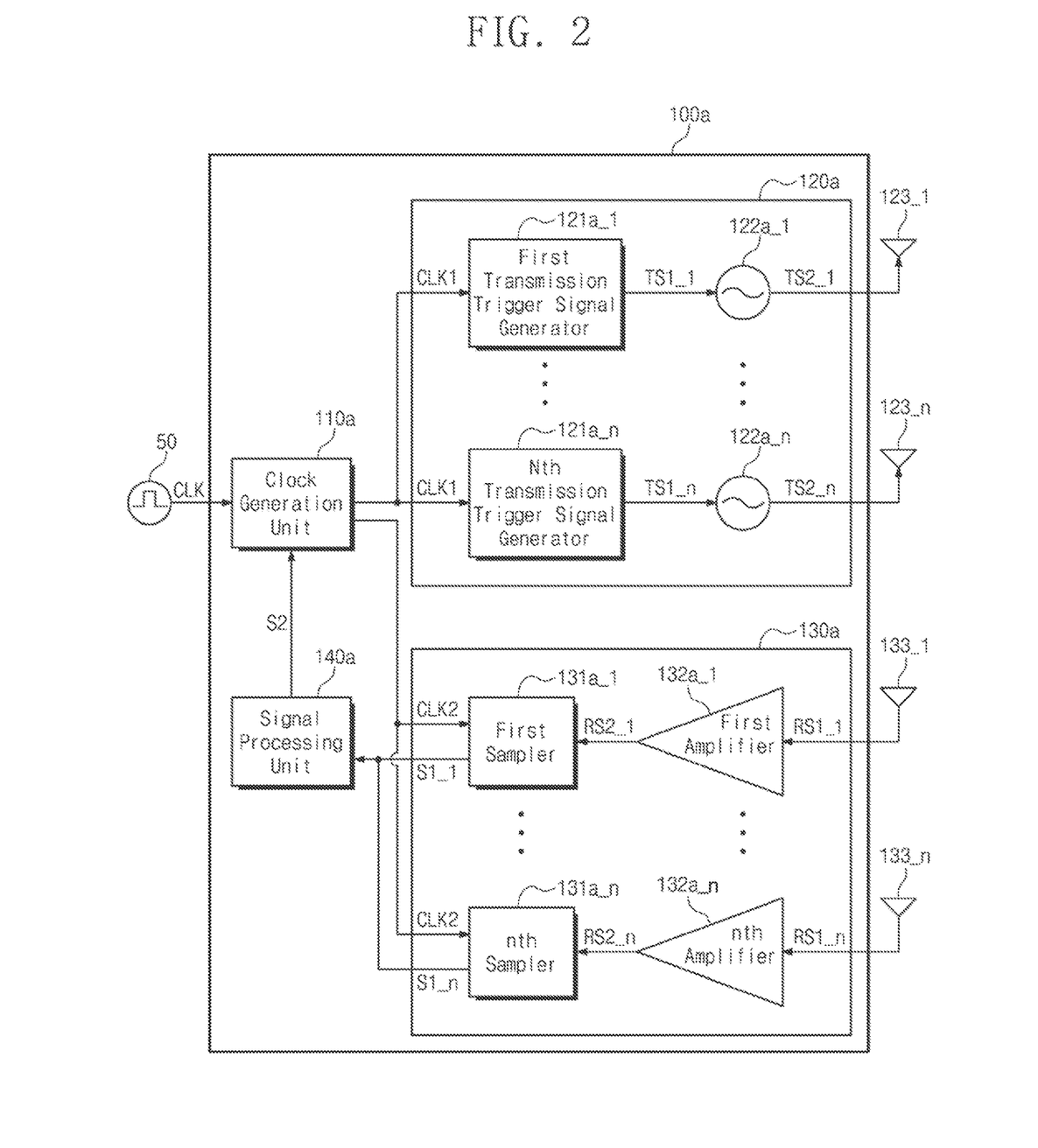
FIG. 2 is a block diagram illustrating a radar device according to an embodiment of the present disclosure.

FIG. 2 is a block diagram illustrating a radar device according to an embodiment of the present disclosure.

Referring to FIG. 2, a radar device 100a may include a clock generation unit 110a, a signal processing unit 140a, a transmission unit 120a, a reception unit 130a, a first transmission antenna 123_1 to an n-th transmission antenna 123_n, and a first reception antenna 133_1 to an n-th reception antenna 133_n. The transmission unit 120a may include a first transmission trigger signal generator 121a_1 to an n-th transmission trigger signal generator 121a_n, and a first oscillator 122a_1 and an n-th oscillator 122a_n. The reception unit 130a may include a first sampler 131a_1 to an n-th sampler 131a_n, and a first amplifier 132a_1 to an n-th amplifier 132a_n.

Each of the first transmission trigger signal generator 121a_1 to the n-th transmission trigger signal generator 121a_n may receive the transmission clock CLK1. The first transmission trigger signal generator 121a_1 to the n-th transmission trigger signal generator 121a_n may output a signal TS1_1 to a signal TS1_n, respectively.

FIG. 2 exemplarily illustrates that the first transmission trigger signal generator 121a_1 to the n-th transmission trigger signal generator 121a_n receive the identical transmission clock CLK1, but each of the first transmission trigger signal generator 121a_1 to the n-th transmission trigger signal generator 121a_n may receive two or more different transmission clocks. For example, the different transmission clocks may have different periods, respectively. At least two of the signal TS1_1 and the signal TS1_n may include transmission trigger pulses of different magnitudes. At least two of the signal TS1_1 and the signal TS1_n may include different pulses.

The first oscillator 122a_1 to the n-th oscillator 122a_n may receive the signal TS1_1 to the signal TS1_n, respectively. The first oscillator 122a_1 to the n-th oscillator 122a_n may output the signal TS2_1 to the signal TS2_n, respectively. At least two of the signal TS1_1 and the signal TS1_n may include different periods. At least two of the signal TS2_1 and the signal TS2_n may include pulses having different magnitudes. At least two of the signal TS2_1 and the signal TS2_n may include pulses having different widths.

On the basis of the signal TS2_1 to the signal TS2_n, the radar device 100a may emit n transmission signals through the first transmission antenna 123_1 to the n-th transmission antenna 123_n. The first reception antenna 133_1 to the n-th reception antenna 133_n may receive echo signals corresponding to the transmission signals. The first reception antenna 133_1 to the n-th reception antenna 133_n may receive the echo signals to generate the signal RS1_1 to the signal RS1_n, respectively.

The first amplifier 132a_1 to the n–th amplifier 132a_n may receive the signal RS1_1 to the signal RS1_n, respectively. A first sampler 131a_1 to an n-th sampler 131a_n may sample a signal RS2_1 to a signal RS2_n, respectively, on the basis of the reception clock CLK2. The first sampler 131a_1 to the n-th sampler 131a_n may output sampled signals S1_1 to S1_n to the signal processing unit 140a.

FIG. 2 exemplarily illustrates that the first sampler 131a_1 to the n-th sampler 131a_n receive the identical reception clock CLK2, but the first sampler 131a_1 to the n-th sampler 131a_n may receive two or more different reception clocks. For example, the different reception clocks may be output on the basis of the different delays.

The reception unit 130a may receive different echo signals from targets respectively located at different detection ranges. The first sampler 131a_1 to the n-th sampler 131a_n may sample the signal RS2_1 to the signal RS2_n generated based on the receive echo signals, respectively.

Figure 3:
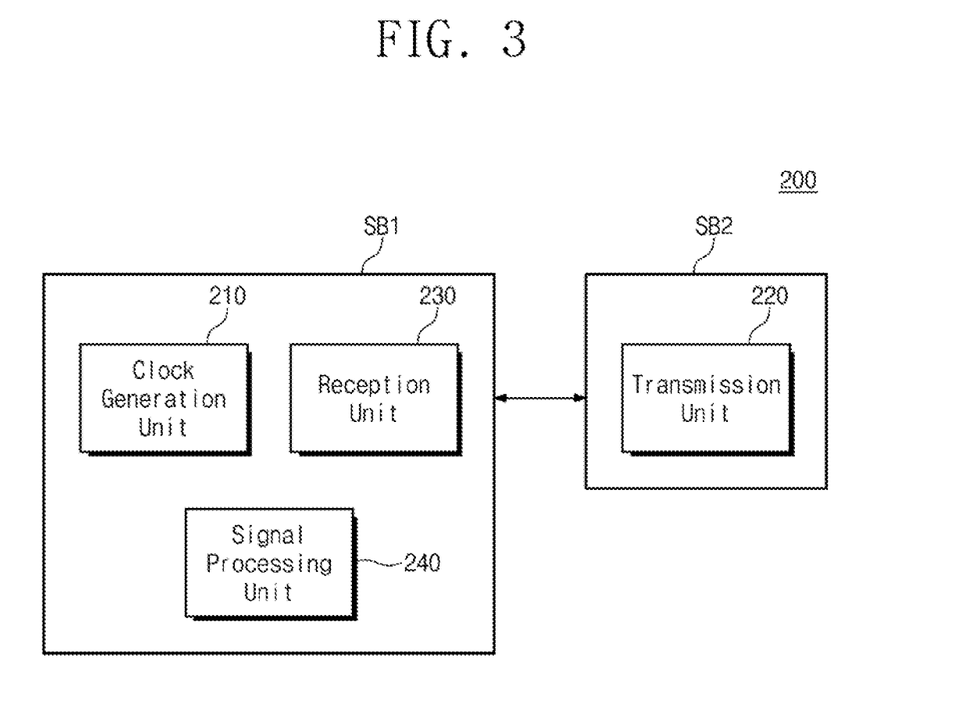
FIG. 3 is a block diagram illustrating a radar device according to an embodiment of the present disclosure.

FIG. 3 is a block diagram illustrating a radar device according to an embodiment of the present disclosure. A radar device 200 of FIG. 3 may include at least one of the radar device 100 of FIG. 1 and the radar device 100a of FIG. 2. A clock generation unit 210 of FIG. 3 may include at least one of the clock generation unit 110 of FIG. 1 and the clock generation unit 110a of FIG. 2. A transmission unit 220 of FIG. 3 may include at least one of the transmission unit 120 of FIG. 1 and the transmission unit 120a of FIG. 2. A reception unit 230 of FIG. 3 may include at least one of the reception unit 130 of FIG. 1 and the reception unit 130a of FIG. 2. A signal processing unit 240 of FIG. 3 may include at least one of the signal processing unit 140 of FIG. 1 and the signal processing unit 140a of FIG. 2.

Referring to FIG. 3, the radar device 200 may include a first board SB1 and a second board SB2. The clock generation unit 210, the reception unit 230, and the signal processing unit 240 may be disposed on the first board SB1. The transmission unit 120 may disposed on the second board SB2. The first board SB1 and the second board SB2 may be separately implemented. The connection relationships between the clock generation unit 210, the transmission unit 220, the reception unit 240, and the signal processing unit 240 are similar to those described with reference to FIGS. 1 and 2, and thus descriptions thereabout will be omitted. The configurations and operations of the clock generation unit 210, the transmission unit 220, the reception unit 230, and the signal processing unit 240 are similar to those described with reference to FIGS. 1 and 2, and thus descriptions thereabout will be omitted.

When all the elements of the radar device 200 are disposed on one board, the transmission unit 220 may be disposed close to the reception unit 230. When the transmission unit 220 and the reception unit 230 are disposed close to each other, signals generated by the transmission unit 220 may be applied to the reception unit 230 to cause coupling. Signals generated from the clock generation unit 210 and the signal processing unit 240 may generate noise caused by the coupling. The signal processing unit 240 may perform calculation on the basis of a signal included in the noise. Accordingly, the signal processing unit 240 may not accurately calculate the delay, the location of a target, and the speed of the target, etc.

When a board on which the transmission unit 220 is disposed and a board on which the clock generation unit 210, the reception unit 230, and the signal processing unit 240 are disposed are different from each other, the coupling may decrease. Accordingly, the signal processing unit 240 may accurately calculate the delay, the location of the target, and the speed of the target, etc.

Figure 4:
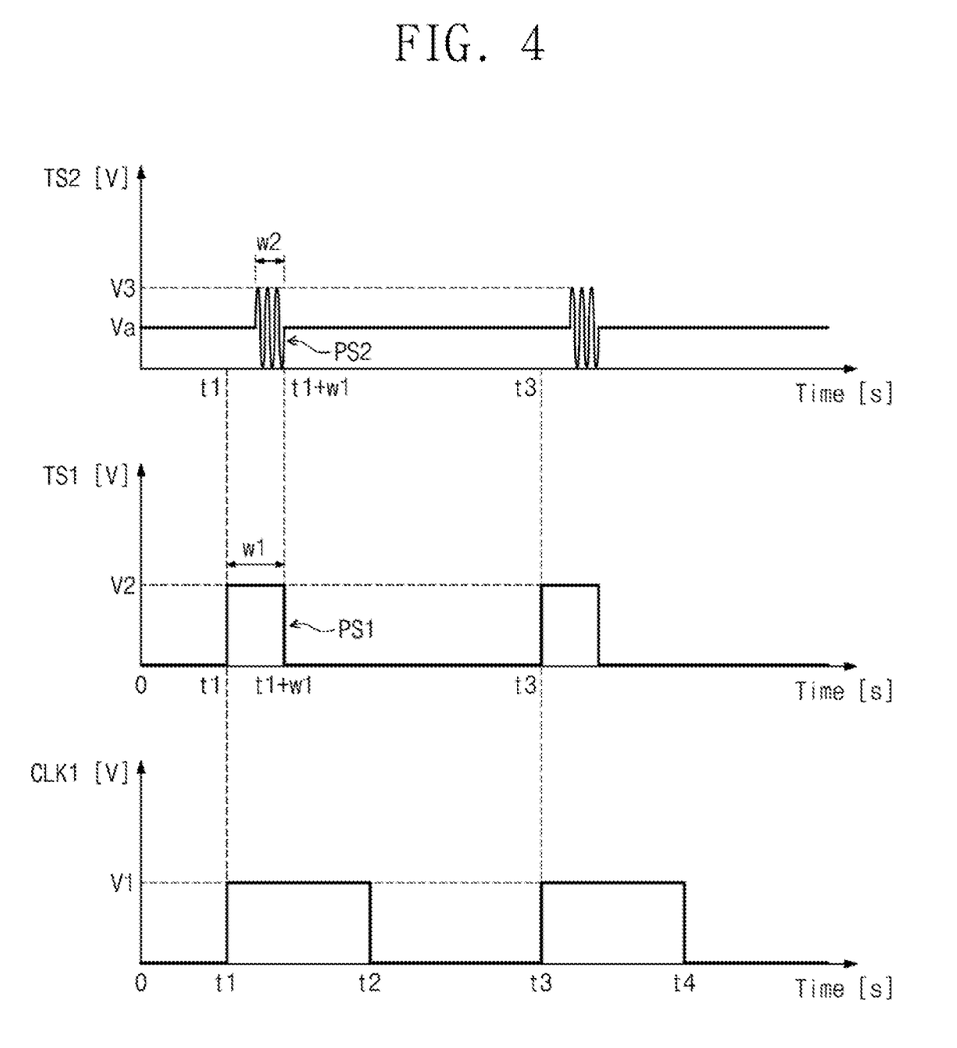
FIG. 4 is a timing diagram showing the exemplary magnitude of a transmission clock and the exemplary magnitudes of signals generated in a transmission unit.

FIG. 4 is a timing diagram showing the exemplary magnitude of the transmission clock and the magnitudes of signals generated in the transmission unit. The example shown in FIG. 4, X-axes in the graphs may indicate a time in a unit [s]. Y-axes in the graphs may indicate the magnitudes of the transmission clock CLK1, the transmission trigger signal TS1, and the signal TS2 in a unit [V].

The transmission clock CLK1 of FIG. 4 may be generated by the clock generation unit 110 of FIG. 1, the clock generation unit 110a of FIG. 2, or the clock generation unit 210 of FIG. 3. The transmission trigger signal TS1 of FIG. 4 may be generated by one among the transmission trigger signal generator 121 of FIG. 1 and the first transmission trigger signal generator 121a_1 to the n-th transmission trigger signal generator 121a_n of FIG. 2. The signal TS2 of FIG. 4 may be generated by one of the oscillator 122 of FIG. 1 and the first oscillator 122a_1 to the n-th oscillator 122a_n of FIG. 2.

Hereinafter, the transmission clock CLK1 generated by the clock generation unit 110 of FIG. 1, the transmission trigger signal TS1 generated by the transmission trigger signal generator 121 of FIG. 1 and the signal TS2 generated by the oscillator 122 of FIG. 1 will be described.

Referring to FIG. 4, before time t1, the magnitudes of the transmission clock CLK1 and the transmission trigger signal TS1 may be 0. 0 may correspond to a logic low value of the transmission clock CLK1. The magnitude of the signal TS2 may be Va. As described with reference to FIG. 1, the magnitude of the signal TS2 in the present specification may mean ½ of the peak-to-peak voltage of the signal TS2. For example, the magnitude of the signal TS2 may be Va in FIG. 4.

At time t1, the magnitude of the transmission clock CLK1 may increase from 0 to V1. V1 may correspond to a logic high value of the transmission clock CLK1. The transmission trigger signal generator 121 may increase the magnitude of the transmission trigger signal TS1 from 0 to V2 in response to the rising edge of the transmission clock CLK1. At the time t2, the magnitude of the transmission clock CLK1 may decrease from V1 to 0.

After time t1, the transmission trigger signal generator 121 may generate the transmission trigger pulse PS1 having the width w1 and the magnitude V2 in response to the rising edge of the transmission clock CLK1. The transmission trigger generator 121 may maintain the magnitude of the transmission trigger signal TS1 to V2 during a time corresponding to the width w1. At time (t1+w1), the transmission trigger signal generator 121 may reduce the magnitude of the transmission trigger signal TS1 from V2 to 0.

Figure 5:
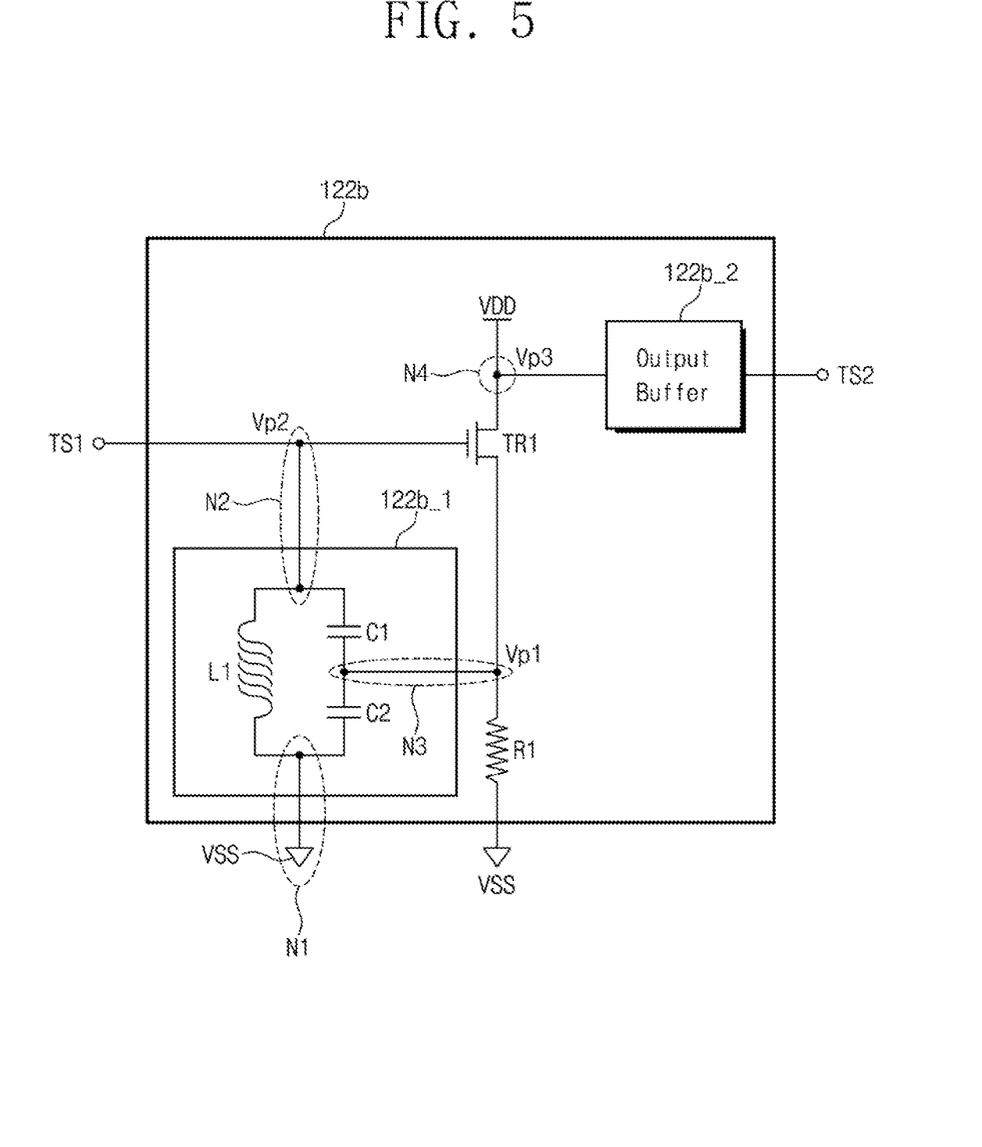
FIG. 5 is a circuit diagram showing an exemplary configuration of an oscillator of FIG. 1 or FIG. 2.

The transmission trigger signal generator 121 may include various types of pulse generators in order to generate the transmission trigger pulse PS1 having the specific width and the specific magnitude. The magnitude and the width of the transmission trigger pulse PS1 may be determined in consideration of the characteristics of the oscillator 122. Referring to FIG. 5, an exemplary scheme for determining the magnitude and the width of the transmission trigger pulse PS1 will be described.

The oscillator 122 may generate the pulse PS2 on the basis of the transmission trigger pulse PS1 of the transmission triggers signal TS1. For example, the pulse PS2 may be a sinusoidal wave. The pulse PS2 may be generated by the oscillator 122, when a reference time has passed from time t1. The width of the pulse PS2 may be w2 and the magnitude of the pulse PS2 may be (V3−Va). The sinusoidal wave-type pulse may have a common mode voltage. For example, the common mode voltage of the pulse PS2 may be Va. In reference to FIG. 5, the reference time and an operation in which the pulse PS2 is generated by the pulse PS1 of the transmission trigger signal TS1 will be described in detail.

At time t3, the magnitude of the transmission clock CLK1 may increase again from 0 to V1. At time t4, the magnitude of the transmission clock CLK1 may decrease from V1 to 0. Accordingly, the period of the transmission clock CLK1 may be (t3−t1).

Since the transmission trigger signal TS1 is generated in response to the rising edge of the transmission clock CLK1, the period of the transmission trigger signal TS1 may be substantially the same as that of the transmission clock CLK1. After time t3, the transmission trigger signal generator 121 may generate transmission trigger pulses similar to the transmission trigger pulse PS1 in a period of (t3−t1).

Since the signal TS2 is generated in response to the transmission trigger pulse PS1, the period of the signal TS2 may be substantially the same as that of the transmission trigger signal TS1. After time t3, the oscillator 122 may generate pulses similar to the pulse PS2 in a period of (t3−t1).

FIG. 5 is a circuit diagram showing an exemplary configuration of the oscillator of FIG. 1 or FIG. 2.

The oscillator 122 of FIG. 1 may include an oscillator 122b of FIG. 5. Each of the first oscillator 122a_1 to the n-th oscillator 122a_n of FIG. 2 may include the oscillator 122b of FIG. 5.

Referring to FIG. 5, the oscillator 122b may include a feedback circuit unit 122b_1, an output buffer 122b_2, a resistor R1, and a transistor TR1. The feedback circuit unit 122b_1 may include an inductive element L1, a capacitive element C1, and a capacitive element C2. For example, the transistor TR1 may be one of transistors such as a Field Effect Transistor (FET) and a bipolar transistor. For example, the transistor TR1 may be a gallium nitride (GaN) transistor.

The feedback circuit unit 122b_1 may be connected between a node N1 and a node N2. A voltage VSS may be applied from the node N1 to the feedback circuit unit 122b_1. For example, the voltage VSS may be a ground voltage. A gate terminal of the transistor TR1 may be connected to the node N2. A voltage VDD may be applied to one end of the transistor TR1 through a node N4. The other end of the transistor TR1 may be connected to a node N3. One end of the resistor R1 may be connected to the node N3. The voltage VSS may be applied to the other end of the resistor R1. The output buffer 122b_2 may be connected to the node N4. Although not shown in FIG. 5, the voltage VDD may be applied to the node N4 through a load. For example, the load may include one or more inductive elements.

The inductive element L1 may be connected between the node N1 and the node N2. The capacitive element C1 may be connected between the node N2 and the node N3. The capacitive element C2 may be connected between the node N3 and the node N1.

Referring to FIG. 4 together with FIG. 5, the magnitude of the transmission trigger pulse PS1 included in the transmission trigger signal TS1 may be determined according to the characteristics of the transistor TR1. The transistor TR1 may have a threshold voltage as a characteristic value. When the magnitude of the voltage applied through the gate terminal increases by the magnitude of the threshold voltage, the transistor TR1 may be turned on. Accordingly, in order to turn on the transistor TR1, the magnitude of the transmission trigger pulse PS1 may be determined as a value equal to or greater than the magnitude of the threshold voltage. For example, the magnitude of the threshold voltage may be V2.

The width w1 of the transmission trigger pulse PS1 included in the transmission trigger signal TS1 may be determined according to the characteristics of the transistor TR1 and the characteristics of the feedback circuit unit 122b_1. Hereinafter, an exemplary scheme for determining the width w1 of the transmission trigger pulse PS1 will be described.

The transmission trigger pulse PS1 received at the node N2 may be received through the gate terminal of the transistor TR1. A voltage may be formed at the gate terminal of the transistor TR1 by the transmission trigger pulse PS1 received through the gate terminal of the transistor TR1.

In addition, the transmission trigger pulse PS1 received at the node N2 may be received by the feedback circuit unit 122b_1. The transmission trigger pulse PS1 may be used to store energy to the inductive element L1, the capacitive element C1, and the capacitive element C2 of the feedback circuit unit 122b_1.

When the voltage, which is formed at the gate terminal of the transistor TR1 by the signal received through the gate terminal, is maintained during a reference time or longer, the transistor TR1 may be turned on. Since the transmission trigger pulse PS1 may be used to store energy to the elements of the feedback circuit unit 122b_1, as the inductive element L1, the capacitive element C1, and the capacitive element C2 of the feedback circuit unit 122b_1 store more energy, the reference time may become long.

Accordingly, in order to supply the voltage to the transistor TR1 during the reference time or longer and charge the elements of the feedback circuit unit 122b_1, the width w1 of the transmission trigger pulse PS1 may be determined so as to correspond to sufficiently longer time than the reference time. A designer may design the pulse generator included in the transmission trigger signal generator 121 such that the transmission trigger pulse PS1 having the determined magnitude V2 and width w1 is generated from the transmission trigger signal generator 121.

Referring to FIG. 4 again, since the reference time is taken to turn on the transistor TR1, the pulse PS2 may be generated by the oscillator 122 after the reference time has passed from time t1. Accordingly, a generation time of the pulse PS2 may be later than time t1. Hereinafter, referring to FIG. 4 together with FIG. 5, a signal flow in the oscillator 122b_1 will be described.

The transmission trigger signal TS1 may be received at the node N2 from the transmission trigger signal generator 121. The transmission trigger signal TS1 of FIG. 5 may be the transmission signal TS1 of FIG. 4. The transistor TR1 may be turned on or off in response to the transmission trigger signal TS1.

Before time t1, the magnitude of the transmission trigger signal TS1 may be 0. The transistor TR1 may be turned off in response to the transmission trigger signal TS1 received through the gate terminal. Between time t1 and time (t1+w1), the magnitude of the transmission triggers signal TS1 may be V2. The transistor TR1 may be turned on, after a reference time has passed from time t1 in response to the transmission trigger pulse PS1 included in the transmission trigger signal TS1. The transistor TR1 may be turned on, before the magnitude of the transmission trigger signal TS1 is reduced to 0 again.

As the transistor TR1 is turned on, a signal Vp1 corresponding to the transmission trigger signal TS1 may be generated at the node N3.

The feedback circuit unit 122b_1 may provide a positive feedback path with respect to the signal Vp1. The feedback circuit unit 122b_1 may pass, to the node N2, a signal Vp2 including a center frequency component among frequency components included in the signal Vp1. For example, the feedback circuit unit 122b_1 may play a role of a band pass filter having the characteristics of the center frequency. For example, the signal Vp2 may include a sinusoidal wave having the center frequency.

The frequency characteristics of the feedback circuit unit 122b_1 may be determined by values of the inductive element L1, the capacitive element C1 and the capacitive element C2. The designer may adjust values of the inductive element L1, the capacitive element C1 and the capacitive element C2 to set the center frequency.

As the above described processes are repeated, the magnitude of the signal generated at the node N2 converges to the certain magnitude, and the frequency of signal generated at the node N2 may converge to the center frequency. For convenience of explanation, a signal having the converged magnitude and the center frequency will be referred to as a signal Vp2.

The signal Vp2 and the transmission trigger signal TS1 may be received through the gate terminal of the transistor TR1. While the transistor TR1 is turned on in response to the transmission trigger signal TS1, a signal Vp3 of the node N4 may be generated. Accordingly, the signal Vp3 may include a pulse having the width corresponding to the width w1 of the transmission trigger pulse PS1 included in the transmission trigger signal TS1.

The magnitude of current passing through the transistor TR1 may be proportional to the voltage applied to the gate terminal of the transistor TR1, and the magnitude of the voltage generated at the node N4 may be proportional to the magnitude of the current passing through the transistor TR1. Accordingly, the magnitude of the voltage formed at the node N4 may be proportional to the magnitude of the voltage applied to the gate terminal of the transistor TR1. For example, the transistor TR1 may play a role of a common source amplifier. Accordingly, the signal Vp3 may include a waveform similar to that of the signal Vp2. For example, the signal Vp3 may be a sinusoidal wave having the center frequency.

The output buffer 122b_2 may output a signal TS2 having substantially the same characteristics as the signal Vp3. Accordingly, the signal TS2 may include a sinusoidal type pulse having substantially the same frequency as the center frequency. The magnitude and width of the pulse included in the signal TS2 may be substantially the same as those of the pulse included in the signal Vp3. The period of the signal TS2 may be substantially the same as that of the signal Vp3. In addition, the magnitude of the signal Vp3 is related to the magnitude of the signal Vp2, and since the signal Vp2 is generated based on the signal TS1, the magnitude of the signal Vp3 may be related to that of the signal TS1.

According to the above-described processes, the width w2 of the pulse PS2 may be related to the width w1 of the transmission trigger pulse PS1. The magnitude of the pulse PS2 may be related to the magnitude of the transmission trigger pulse PS1. For example, as the magnitude of the transmission trigger pulse PS1 is larger, the magnitude of the pulse PS2 may be large. A frequency of the sinusoidal wave included in the pulse PS2 may be the center frequency determined by the elements of the feedback circuit unit 122b_1.

As described with reference to FIG. 1, the transmission antenna 123 may generate the transmission signal 11 on the basis of the signal TS2. The transmission signal 11 may include a pulse corresponding to the pulse included in the signal TS2. Accordingly, the transmission trigger signal generator 121 may adjust the width and magnitude of the pulse included in the transmission signal 11. The transmission antenna 123 may emit the transmission signal 11.

As described with reference to FIG. 1, the echo signal 12 may include a signal component for indicating information related to the target 10 (hereinafter, a signal component). In addition, the echo signal 12 may include a noise component (e.g., a signal component generated by interference between a communication signal or the like in the air and the echo signal 12) generated by an external environment.

A signal-to-noise ratio means a ratio of the magnitude of the signal component to the magnitude of the noise component. As the magnitude of the pulse included in the echo signal 12 is larger, the magnitude of the signal component included in the echo signal 12 may be larger. As the magnitude of the signal component included in the echo signal 12 is larger, the signal-to-noise ratio of the echo signal 12 may increase. As the echo signal 12 has the higher signal-to-noise ratio, the radar device 100 may accurately acquire the information on the target 10 (e.g., information on the location, the speed or the like of the target 10).

As described with reference to FIG. 1, the echo signal 12 may be generated based on the transmission signal 11. The magnitude of the pulse included in the echo signal 12 may correspond to the magnitude of the pulse included in the transmission signal 11. Accordingly, as the signal TS2 is adjusted using the transmission trigger signal TS1, the radar device 100 may acquire accurate information.

Figure 6:
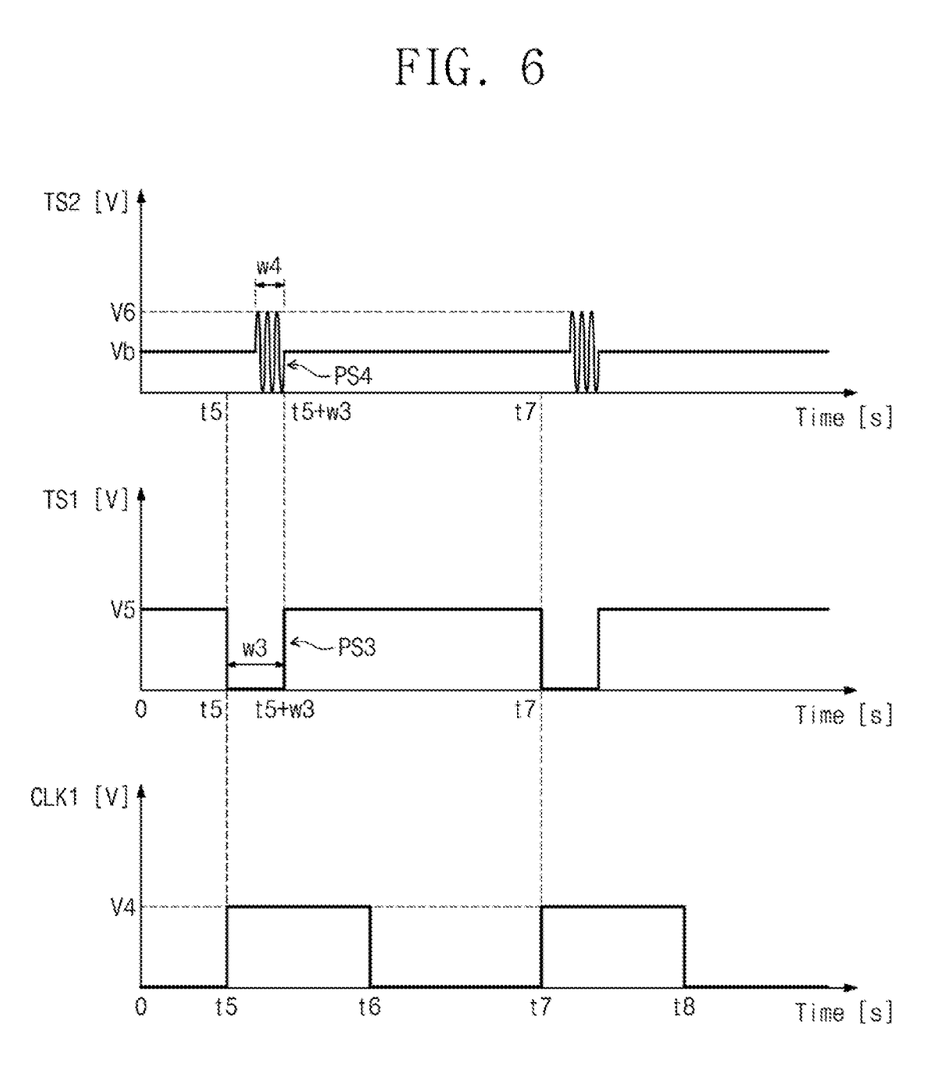
FIG. 6 is a timing diagram showing the exemplary magnitude of a transmission clock and the exemplary magnitudes of signals generated in a transmission unit.

FIG. 6 is a timing diagram showing the exemplary magnitude of a transmission clock and the magnitudes of signals generated in the transmission unit. The example shown in FIG. 6, X-axes in the graphs may indicate a time in a unit [s]. Y-axes in the graphs may indicate the magnitudes of the transmission clock CLK1, a transmission trigger signal TS1, and a signal TS2 in a unit [V].

The transmission clock CLK1 of FIG. 6 may be generated by the clock generation unit 110 of FIG. 1, the clock generation unit 110a of FIG. 2, or the clock generation unit 210 of FIG. 3. The transmission trigger signal TS1 of FIG. 6 may be generated by one among the transmission trigger signal generator 121 of FIG. 1 and the first transmission trigger signal generator 121a_1 to the n-th transmission trigger signal generator 121a_n of FIG. 2. The signal TS2 of FIG. 6 may be generated by one among the oscillator 122 of FIG. 1 and the first oscillator 122a_1 to the n-th oscillator 122a_n of FIG. 2.

Hereinafter, the transmission clock CLK1 generated by the clock generator 110 of FIG. 1, the transmission trigger signal TS1 generated by the transmission trigger signal generator 121 of FIG. 1 and the signal TS2 generated by the oscillator 122 of FIG. 1 will be described.

Referring to FIG. 6, before time t5, the magnitude of the transmission clock CLK1 may be 0. 0 may correspond to a logic low value of the transmission clock CLK1. The magnitude of the transmission trigger signal TS1 may be V5. The magnitude of the signal TS2 may be Vb. As described with reference to FIG. 1, the magnitude of the signal TS2 in the present specification may mean ½ of the peak-to-peak voltage of the signal TS2. For example, in FIG. 6, the magnitude of the signal TS2 may be (V6−Vb).

At time t5, the magnitude of the transmission clock CLK1 may increase from 0 to V4. V4 may correspond to a logic high value of the transmission clock CLK1. The transmission trigger signal generator 121 may decrease the magnitude of the transmission trigger signal TS1 from V5 to 0 in response to the rising edge of the transmission clock CLK1. At time t6, the magnitude of the transmission clock CLK1 may decrease from V4 to 0.

After time t5, the transmission trigger signal generator 121 may generate a transmission trigger pulse PS3 having the width of w3 and the magnitude of V5 in response to the rising edge of the clock CLK1. The transmission trigger signal generator 121 may maintain the magnitude of the transmission trigger signal TS1 to 0 during a time corresponding to w3. At time (t3+w3), the transmission trigger signal generator 121 may increase the magnitude of the transmission trigger signal TS1 from 0 to V5.

Figure 7:
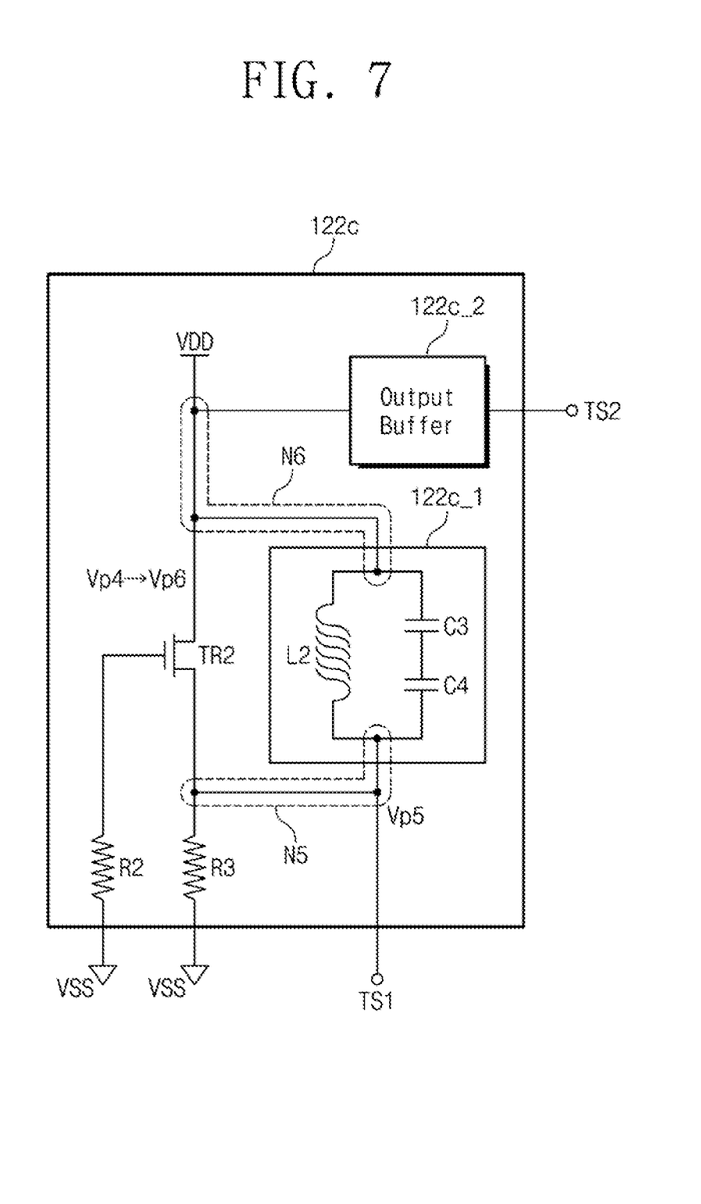
FIG. 7 is a circuit diagram showing an exemplary configuration of an oscillator of FIG. 1 or FIG. 2.

The transmission trigger signal generator 121 may include one or more of various types of pulse generators in order to generate the transmission trigger pulse PS3. The magnitude and the width of the transmission trigger pulse PS3 may be determined in consideration of the characteristics of the oscillator 122. Referring to FIG. 7, an exemplary scheme for determining the magnitude and the width of the transmission trigger pulse PS3 will be described.

The oscillator 122 may generate a pulse PS4 in response to the falling edge of the transmission trigger pulse PS3. The pulse PS4 may be generated by the oscillator 122, when a reference time has passed from the time t5. The width of the pulse PS4 may be w4, the magnitude of the pulse PS4 may be (V6−Vb), and the common mode voltage of the pulse PS4 may be Vb. Referring to FIG. 7, detailed descriptions will be provided about the reference time and a process in which the pulse PS4 is generated by the transmission trigger pulse PS3 of the transmission trigger signal TS1.

At time t7, the magnitude of the transmission clock CLK1 may increase again from 0 to V4. At time t8, the magnitude of the transmission clock CLK1 may decrease from V4 to 0. The period of the transmission clock CLK1 may be (t7−t5).

Since the transmission trigger signal TS2 is generated in response to the rising edge of the transmission clock CLK1, the period of the transmission trigger signal TS1 may be substantially the same as that of the transmission clock CLK1. After time t7, the transmission trigger signal generator 121 may generate transmission trigger pulses similar to the transmission trigger pulse PS3 in a period of (t7−t5).

Since the signal TS2 is generated in response to the transmission trigger pulse PS3, the period of the signal TS2 may be substantially the same as that of the trigger signal TS1. After time t7, the oscillator 122 may generate pulses similar to the pulse PS4 in a period of (t7−t5).

FIG. 7 is a circuit diagram showing an exemplary configuration of the oscillator of FIG. 1 or FIG. 2.

The oscillator 122 of FIG. 1 may include an oscillator 122c of FIG. 7. Each of the first oscillator 122a_1 to the n-th oscillator 122a_n of FIG. 2 may include the oscillator 122c of FIG. 7. With reference to FIG. 7, the oscillator 122c may include a feedback circuit unit 122c_1, an output buffer 122c_2, a resistor R2, a resistor R3, and a transistor TR2. The feedback circuit unit 122c_1 may include an inductive element L2, a capacitive element C3, and a capacitive element C4.

The feedback circuit unit 122c_1 may be connected between a node N5 and a node N6. One end of the transistor TR2 may be connected to the node N5. A voltage VDD may be applied to the other end of the transistor TR2 through the node N6. The gate terminal of the transistor TR2 may be connected to one end of the resistor R2. A voltage VSS may be applied to the other end of the resistor R2. For example, the voltage VSS may be the ground voltage. One end of the resistor R3 may be connected to the node N5. A voltage VSS may be applied to the other end of the resistor R3. The output buffer 122c_2 may be connected to the node N6. Although not shown in FIG. 7, the voltage VDD may be applied to the node N6 through a load. For example, the load may include one or more inductive elements.

The inductive element L2 may be connected between the node N5 and the node N6. The capacitive element C3 may be connected between the node N6 and the capacitive element C4. The capacitive element C4 may be connected between the capacitive element C3 and the node N5. Although not shown in FIG. 7, the voltage VSS may be applied through a node between the capacitive element C3 and the capacitive element C4.

With reference to FIG. 6 together with FIG. 7, the magnitude of the pulse PS3 included in the transmission trigger signal TS1 may be determined according to the characteristics of the transistor TR2. The transistor TR2 may have a threshold voltage as a characteristic value. When the magnitude of the voltage received through the node N5 decreases by the magnitude of the threshold voltage, the transistor TR2 may be turned on. Accordingly, in order to turn on the transistor TR2, the magnitude of the transmission trigger pulse PS3 may be determined as a value equal to greater than the magnitude of the threshold voltage. For example, the magnitude of the threshold voltage may be V5.

The width w3 of the transmission trigger pulse PS3 included in the transmission trigger signal TS1 may be determined according to the characteristics of the transistor TR2 and the characteristics of the feedback circuit unit 122c_1. Hereinafter, an exemplary scheme for determining the width w3 of the transmission trigger pulse PS3 will be described.

The transmission trigger pulse PS3 of the signal TS1 may be received at the node N5. A voltage may be formed at the node N5 by the transmission trigger pulse PS3. In addition, the transmission trigger pulse PS3 received at the node N5 may be received by the feedback circuit unit 122c_1. The transmission trigger pulse PS3 may be used to store energy to the inductive element L2, the capacitive element C3, and the capacitive element C4 of the feedback circuit unit 122c_1.

The transistor TR2 may be turned on, when the voltage formed at the node N5 by the transmission trigger pulse PS3 received through the node N5 is maintained during the reference time. As described above, since the transmission trigger pulse PS3 is used to store energy to the elements of the feedback circuit unit 122c_1, the reference time may become long, as the inductive element L2, the capacitive element C3, and the capacitive element C4 of the feedback circuit unit 122c_1 store more energy.

Accordingly, in order to supply the voltage to the transistor TR2 during a time of the reference time or longer and charge the elements of the feedback circuit unit 122c_1, the width w3 of the transmission trigger pulse PS3 may be determined so as to correspond to a time sufficiently longer time than the reference time. The designer may design a pulse generator included in the transmission trigger signal generator 121 such that the transmission trigger pulse PS3 having the determined magnitude V5 and the width w3 is generated from the transmission trigger signal generator 121.

Referring to FIG. 6 again, since the reference time is taken to turn on the transistor TR2, the pulse PS4 may be generated by the oscillator 122 after the reference time has passed from time t5. Accordingly, a generation time of the transmission trigger pulse PS3 may be later than time t5. Hereinafter, with reference to FIG. 6 together with FIG. 7, a signal flow in the oscillator 122c_1 will be described.

The transmission trigger signal TS1 may be received at the node N5 from the transmission trigger signal generator 121. The transmission trigger signal TS1 of FIG. 7 may be the transmission signal TS1 of FIG. 6. The transistor TR2 may be turned on or off in response to the transmission trigger signal TS1.

Before time t5, the magnitude of the transmission trigger signal TS1 may be V5. The transistor TR2 may be turned off in response to the transmission trigger signal TS1 received at the node N5. The magnitude of the transmission trigger signal TS1 may be 0 between time t5 and time (t5+w3). The transistor TR2 may be turned on after the reference time has passed from the time t5 in response to the transmission trigger pulse PS3 included in the transmission trigger signal TS1. The transistor TR2 may be turned on, before the magnitude of the transmission trigger signal TS1 increases to V5 again.

As the transistor TR2 is turned on, a signal Vp4 corresponding to the transmission trigger signal TS1 may be generated at the node N6.

The feedback circuit unit 122c_1 may provide a path of positive feedback for the signal Vp4. The feedback circuit unit 122c_1 may pass, to the node N5, a signal Vp5 including a center frequency component among frequency components included in the signal Vp4. For example, the feedback circuit unit 122c_1 may play a role of a band pass filter having the center frequency characteristics. For example, the signal Vp5 may include a sinusoidal wave having the center frequency.

The frequency characteristics of the feedback circuit unit 122c_1 may be determined by values of the inductive element L2, the capacitive element C3 and the capacitive element C4. The designer may adjust values of inductive element L2, the capacitive element C3 and the capacitive element C4 to set the center frequency.

The signal Vp5 and the trigger signal TS1 may be received at node N5. While the transistor TR2 is turned on in response to the transmission trigger signal TS1, a signal Vp6 may be generated at the node N6. Accordingly, the signal Vp6 may include a pulse having the width corresponding to the width w3 of the transmission trigger pulse PS3 included in the transmission trigger signal TS1. In addition, the signal Vp6 may have substantially the same period as the period of the transmission trigger signal TS1.

The magnitude of current passing through the transistor TR2 may be proportional to the voltage applied to the node N5, and the magnitude of the voltage generated at the node N6 may be proportional to the magnitude of the current passing through the transistor TR2. Accordingly, the magnitude of the voltage formed at the node N6 may be proportional to the magnitude of the voltage applied to the node N5. Accordingly, the signal Vp6 may include a waveform similar to that of the signal Vp5. For example, the signal Vp6 may include a sinusoidal wave having the center frequency.

As the above described processes are repeated, the magnitude of the signal generated at the node N5 converges to the certain magnitude, and the frequency of signal generated at the node N6 may converge to the center frequency. For convenience of explanation, a signal having the converged magnitude and the center frequency will be referred to as the signal Vp6.

The output buffer 122c_2 may output a signal TS2 having substantially the same characteristics as the signal Vp6. Accordingly, the signal TS2 may include a sinusoidal type pulse having substantially the same frequency as the center frequency. The magnitude and width of the pulse included in the signal TS2 may be substantially the same as those of the pulse included in the signal Vp6. The period of the signal TS2 may be substantially the same as that of the signal Vp6.

As described with reference to FIG. 1, the transmission antenna 123 may generate the transmission signal 11 on the basis of the signal TS2. The transmission signal 11 may include a pulse corresponding to the pulse included in the signal TS2. Accordingly, the transmission trigger signal generator 121 may adjust the width and magnitude of the pulse included in the transmission signal 11 by means of the transmission trigger signal TS1. The transmission antenna 123 may emit the transmission signal 11.

Figure 8:
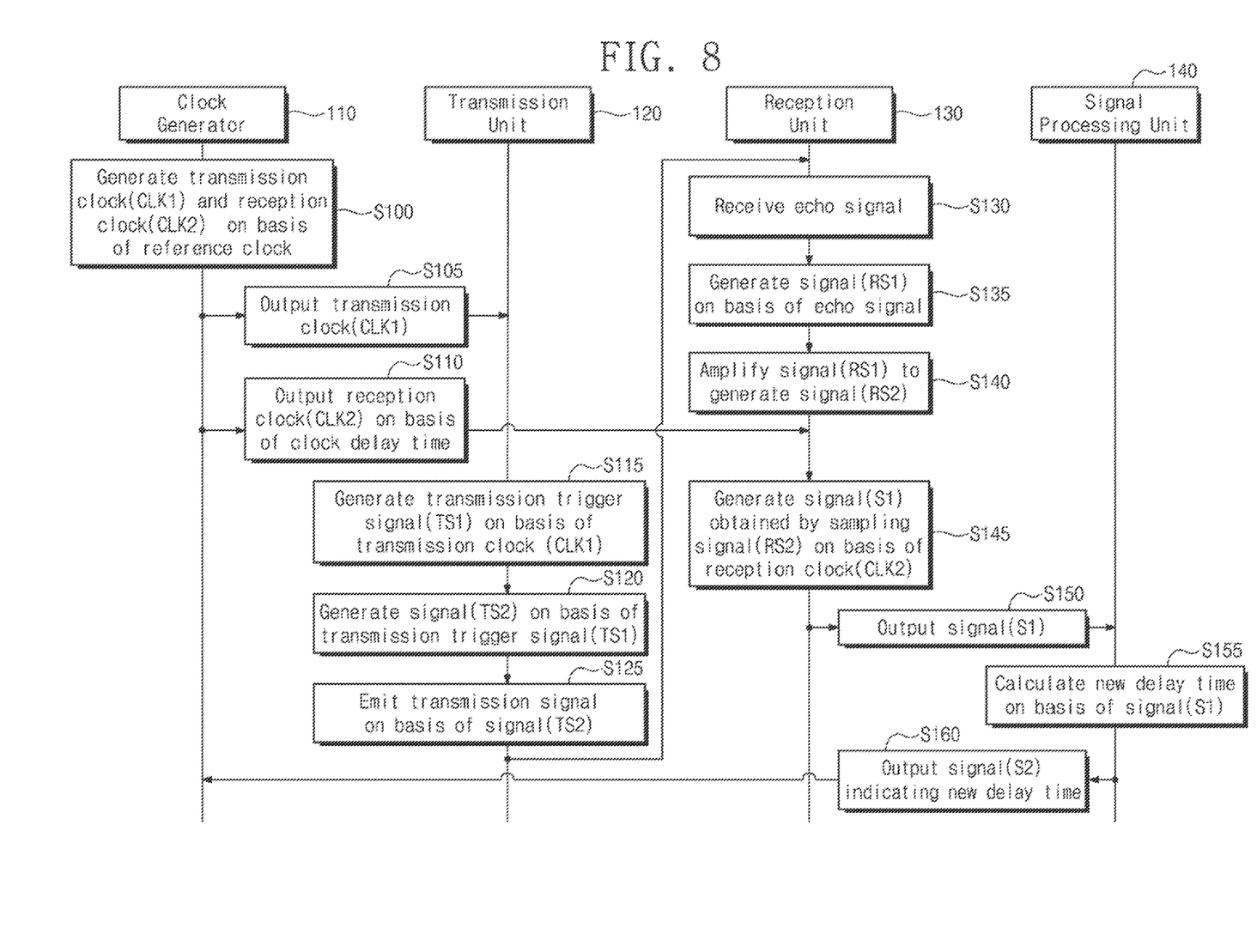
FIG. 8 is a flowchart showing an exemplary operation of the radar device FIG. 1 or FIG. 2.

FIG. 8 is a flowchart showing an exemplary operation of the radar device of FIG. 1.

In operation S100, the clock generator 110 may generate the transmission clock CLK1 and the reception clock CLK2 on the basis of the reference clock CLK. For example, the reference clock CLK may be applied from the reference clock generator located outside the radar device 100.

In operation S105, the clock generator 110 may output the transmission clock CLK1 to the transmission unit 120.

In operation S110, the clock generator 110 may output the reception clock CLK2 to the reception unit 130 on the basis of a delay. For example, the clock generator 110 may output the transmission clock CLK1 in operation S105, and output the reception clock CLK2 to the reception unit 130 after the delay. For example, the delay may be calculated by the signal processing unit 140.

In operation S115, the transmission unit 120 may generate the transmission trigger signal TS1 on the basis of the transmission clock CLK1 output from the clock generator 110 in operation S105. As described with reference to FIG. 1, the transmission unit 120 may include the transmission trigger signal generator 121 so as to generate the transmission trigger signal TS1. An exemplary scheme in which the transmission trigger signal generator 121 generates the transmission trigger signal TS1 is similar to that described with reference to FIGS. 4 to 7, and thus a description thereabout will be omitted below.

In operation S120, the transmission unit 120 may generate the signal TS2 on the basis of the transmission trigger signal TS1. As described with reference to FIG. 1, the transmission unit 120 may include the oscillator 122 so as to generate the signal TS2. An exemplary configuration of the oscillator 122 is the same as that described with reference to FIGS. 5 and 7, and thus a description thereabout will be omitted.

In operation S125, the transmission unit 120 may emit a transmission signal on the basis of the signal TS2. As described with reference to FIG. 1, the transmission unit 120 may include the transmission antenna 123 so as to emit the transmission signal.

In operation S130, the reception unit 130 may receive an echo signal reflected from an object. As described with reference to FIG. 1, the reception unit 130 may include the reception antenna 133 so as to receive the echo signal.

In operation S135, the reception unit 130 may generate the signal RS1 on the basis of the echo signal. As described with reference to FIG. 1, the reception unit 130 may include the reception antenna 133 so as to generate the signal RS1.

In operation S140, the reception unit 130 may amplify the signal RS1 to generate the signal RS2. As described with reference to FIG. 1, the reception unit 130 may include the amplifier 132 so as to amplify the signal RS1.

In operation S145, the reception unit 130 may sample, by means of the sampler 131, the signal RS2 on the basis of the reception clock CLK2 output from the clock generator 110 in operation S110. The sampler 131 may sample the signal RS2 to generate the signal S1.

In operation S150, the reception unit 130 may output the signal S1 to the signal processing unit 140.

In FIG. 8, operations S100 to S150 are illustrated as being performed once, but the inventive concept may include all embodiments of the radar device 100, which perform operations S100 to S150 once or more.

In operation S155, the signal processing unit 140 may calculate a new delay on the basis of the signal S1 received from the reception unit 130 in operation S150. The new delay may be related to the detection range of the radar device 100. The new delay calculated in operation S155 may be the same as or different from the delay having been used in operation S110. An exemplary scheme in which the signal processing unit 140 calculates the delay is similar to that described with reference to FIG. 1, and thus a description thereabout will be omitted.

In operation S160, the signal processing unit 140 may output the signal S2 related to the new delay calculated in operation S155 to the clock generator 110. Accordingly, in operation S100 to S110 again, the transmission clock CLK1 and the reception clock CLK2 may be output on the basis of the new delay.

According to an embodiment of the present disclosure, as a radar device emits a transmission signal having the large magnitude, a signal-to-noise ratio of a signal received by the radar device may increase. Accordingly, the radar device may acquire accurate information related to a target.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A radar device comprising:
a clock generator configured to output a transmission clock, and output a reception clock after a delay from a time point at which the transmission clock is output;
a transmitter comprising a transmission trigger signal generator configured to generate a transmission trigger signal based on the transmission clock and an oscillator configured to generate a first signal based on the transmission trigger signal; and
a receiver configured to receive an echo signal corresponding to the first signal and generate a second signal based on the reception clock and the echo signal,
wherein the first signal is composed of a pulse that is characterized with a pulse width and an amplitude where those characteristics correspond to a pulse width and an amplitude of the transmission trigger signal, respectively.

2. The radar device of claim 1, wherein
the transmitter is connected to a transmission antenna configured to emit a transmission signal based on the first signal, and
the receiver is connected to a reception antenna configured to receive the echo signal corresponding to the transmission signal in relation to generating of the second signal.

3. The radar device of claim 1, wherein the oscillator comprises a feedback circuit configured to provide a positive feedback path such that the first signal has a center frequency.

4. The radar device of claim 3, wherein the feedback circuit receives a first voltage from a first node and is connected to a second node and a third node, and
the oscillator further comprises:
a transistor comprising a gate terminal connected to the second node, one end connected to the third node, and another end configured to receive a second voltage from a fourth node;
a resistor comprising one end connected to the third node, and another end configured to receive the first voltage; and
a buffer connected to the fourth node and configured to output the first signal.

5. The radar device of claim 4, wherein the feedback circuit comprises:
an inductive element connected between the first node and the second node;
a first capacitive element connected between the second node and the third node; and
a second capacitive element connected between the first node and the third node.

6. The radar device of claim 4, wherein the feedback circuit provides the positive feedback path such that a signal is passed through the second node, the signal comprising a component of the center frequency among frequency components of a signal delivered from the one end of the transistor to the third node.

7. The radar device of claim 4, wherein the transistor is turned on in response to a pulse comprised in the transmission trigger signal, and
a time duration during which the transistor is turned on corresponds to the width of the pulse comprised in the transmission trigger signal.

8. The radar device of claim 1, wherein the oscillator comprises a feedback circuit,
the feedback circuit receives the transmission trigger signal from a first node and is connected to a second node, and
the oscillator further comprises:
a transistor comprising a gate terminal, one end connected to the first node, and another end configured to receive a first voltage from the second node;
a first resistor comprising one end connected to the gate terminal of the transistor, and another end configured to receive a second voltage;
a second resistor comprising one end connected to the first node, and another end configured to receive the second voltage; and
a buffer connected to the second node and configured to output the first signal.

9. The radar device of claim 8, wherein the feedback circuit comprises:
an inductive element connected between the first node and the second node;
a first capacitive element connected to the second node; and
a second capacitive element connected between the first capacitive element and the first node.

10. The radar device of claim 1, wherein the receiver comprises a sampler configured to sample a third signal corresponding to the echo signal to generate the second signal.

11. The radar device of claim 8, wherein the feedback circuit provides a positive feedback path such that a signal is passed to the first node, the signal comprising a component of a center frequency among frequency components of a signal delivered from the other end of the transistor to the second node.

12. The radar device of claim 11, further comprising:
a signal processor configured to receive the second signal and calculate a location of a target based on the second signal.

13. The radar device of claim 12, wherein the signal processor is configured to calculate a new delay based on the calculated location of the target.

14. A radar device comprising:
a first board on which a clock generator and a receiver are disposed, the clock generator configured to output a transmission clock and output a reception clock after a delay from a time point at which the transmission clock is output, the receiver configured to receive an echo signal corresponding to a first signal and generate a second signal corresponding to the echo signal; and
a second board on which a transmitter is disposed, the transmitter comprising a transmission trigger signal generator configured to generate a transmission trigger signal based on the transmission clock and an oscillator configured to generate the first signal having a center frequency based on the transmission trigger signal,
wherein a width of a pulse comprised in the transmission trigger signal is narrower than a width of a pulse of the transmission clock, and
wherein the first board and the second board are separately implemented.

15. The radar device of claim 14, wherein the receiver comprises a sampler configured to sample a third signal corresponding to the echo signal to generate the second signal.

16. The radar device of claim 14, further comprising:
a signal processor configured to calculate the delay based on the second signal and output a signal related to the delay to the clock generator,
wherein the signal processor is disposed on the first board.

17. The radar device of claim 16, wherein the delay is related to a detection range, and
the signal processor is configured to adjust the delay to adjust the detection range.

18. The radar device of claim 14, wherein the transmitter comprises a feedback circuit configured to provide a positive feedback path so as to generate the first signal having the center frequency from the transmission trigger signal.

19. The radar device of claim 18, wherein the feedback circuit operates as a band pass filter having characteristics of the center frequency.

20. A radar device comprising:
a transmission trigger signal generator configured to generate a first signal based on a clock; and
an oscillator comprising a feedback circuit configured to pass a center frequency component among frequency components of the first signal to provide a positive feedback path so as to generate a second signal comprising the center frequency component,
wherein a magnitude and a width of the pulse comprised in the second signal correspond to a magnitude and a width of a pulse comprised in the first signal, respectively, and
wherein the width of the pulse comprised in the first signal is narrower than a width of a pulse of the clock.

* * * * *